United States Patent
Alberth, Jr. et al.

(10) Patent No.: US 8,013,717 B2
(45) Date of Patent: Sep. 6, 2011

(54) NEAR-FIELD COMMUNICATION DEVICE WITH ENVIRONMENTAL SENSOR

(75) Inventors: William P. Alberth, Jr., Crystal Lake, IL (US); Patricia A. Robb, Prairie Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 998 days.

(21) Appl. No.: 11/855,513

(22) Filed: Sep. 14, 2007

(65) Prior Publication Data
US 2009/0072951 A1    Mar. 19, 2009

(51) Int. Cl.
*H04Q 5/22* (2006.01)
(52) U.S. Cl. .............. 340/10.41; 340/870.16; 340/505; 705/14.1; 705/14.5
(58) Field of Classification Search .......... 340/870.16, 340/505, 517, 540, 539.1, 572.1, 572.3, 10.41, 340/10.1; 345/157, 161; 709/203, 219; 705/14.1–14.39, 14.4, 14.5
See application file for complete search history.

(56) References Cited

U.S. PATENT DOCUMENTS

| | | | |
|---|---|---|---|
| 7,002,474 B2 * | 2/2006 | De Souza et al. | 340/572.3 |
| 7,135,976 B2 * | 11/2006 | Neff et al. | 340/572.1 |
| 7,401,052 B2 * | 7/2008 | Lyman | 705/50 |
| 7,492,254 B2 * | 2/2009 | Bandy et al. | 340/540 |
| 7,792,927 B2 * | 9/2010 | Umehara et al. | 709/219 |
| 2005/0144273 A1 * | 6/2005 | Dan et al. | 709/224 |
| 2006/0087442 A1 * | 4/2006 | Smith et al. | 340/686.1 |
| 2006/0267731 A1 * | 11/2006 | Chen | 340/10.1 |
| 2007/0040683 A1 * | 2/2007 | Oliver et al. | 340/572.1 |
| 2007/0266310 A1 * | 11/2007 | Sasaki et al. | 715/513 |

FOREIGN PATENT DOCUMENTS
WO    WO 03/077454 A2    9/2003

\* cited by examiner

*Primary Examiner* — Benjamin C Lee
*Assistant Examiner* — Peter Mehravari

(57) ABSTRACT

A wireless communication device includes a near-field activated circuit that transmits an output signal upon exposure to an energizing electromagnetic field, and a sensor having an output coupled to the near-field activated circuit, wherein the sensor produces an output signal in response to sensing an environmental condition other than the energizing electromagnetic field, and wherein the output signal of the near-field activated circuit changes when the sensor changes states.

2 Claims, 3 Drawing Sheets

NEAR-FIELD COMMUNICATION DEVICE WITH ENVIRONMENTAL SENSOR

FIELD OF THE DISCLOSURE

The present disclosure relates generally to wireless communications, and more specifically to a near-field communication device having a sensor wherein the device produces an output that depends on a state of the sensor.

BACKGROUND

Near-field communication devices that transmit information when activated by an electromagnetic field produced by a different device are known generally. Such devices include RFID devices embedded in or otherwise fastened to products. RFID devices provide product identification information, for example, a Universal Product Code (UPC) including product type, lot code, data code, manufacturer and other information useful for inventory control and product monitoring. It is also known to control access to facilities using a near-field device embedded in a host device, for example, in an identification card. Other cards having a near-field device are used for initiating and authorizing purchase transactions, for example, the purchase of petroleum products at service stations.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
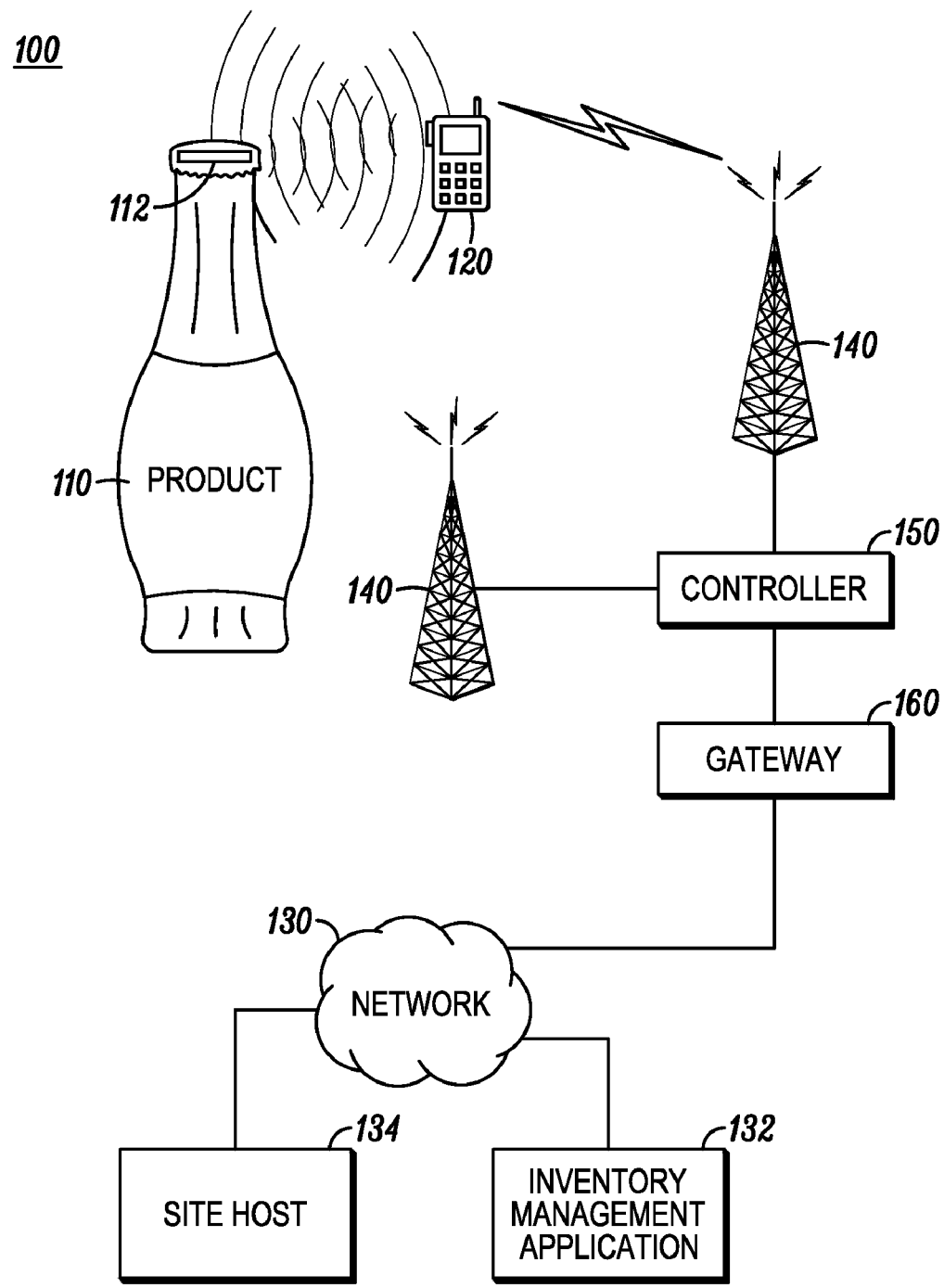
FIG. 1 is a product having a near-field activated circuit and an interrogating device linked with a wireless communication system.

In FIG. 1, a wireless communication system 100 is linked with a product 110 having a wireless communication device 112 energized by an electromagnetic field produced by an activating device 120, which may be referred to as an interrogating device. The device 112 includes a near-field activated circuit that transmits an output signal upon exposure to the energizing electromagnetic field of the activating device 120. The output signal of the near-field activated circuit generally includes information that may be read by a device associated with the activating device. Thus the activating device 120 interrogates the near-field activated device to obtain information stored on the near-field activated device by producing an activating field and receiving the signal transmitted by the near-field activated device, wherein the received signal includes information stored on and transmitted by the activated circuit.

In FIG. 1, the activating device 120 is wirelessly coupled to a communication network 130 via a base node 140. In one implementation, the base node is a base station in a cellular communication system. Alternatively, the base node is an access point in a wide or local area network. In some networks, for example, in cellular communication systems, the base node is communicably coupled to a controller 150 coupled to the network by a gateway 160. In FIG. 1, the network 130 interconnects the activating device 120 with other entities, for example, an inventory management server 132 or a web site on a host server 134. Examples of these and other applications or use cases are discussed more fully below. In other network architectures, the activated device may be coupled to a server or other entity by some other network infrastructure entity.

Figure 2:
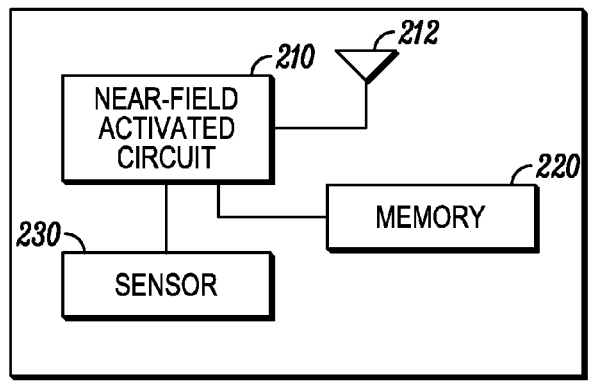
FIG. 2 is a schematic block diagram of a wireless communication device having a near-field activated circuit.

In FIG. 2, the wireless communication device 200 comprises a near-field activated circuit 210 that is energized by an electromagnetic field produced by another device. The near-field activated circuit includes an antenna 212 for receiving the energizing electromagnetic field. The antenna also radiates or transmits a signal from the device upon exposure to the energizing electromagnetic field. The transmitted signal may include information that is programmed into the device, for example, into a non-volatile memory device 220 communicably coupled to the near-field activated circuit. The memory may be programmed with information, for example, identification information, a key or passcode, or some other information, that may be interrogated or read from the device upon exposure of the device to an energizing field. In some embodiments, some or all of the information transmitted by the near-field activated circuit is conditioned upon the occurrence of an event other than exposure to the electromagnetic field.

In the embodiment of FIG. 2, the wireless communication device 200 includes a sensor 230 having an output that changes states upon exposure to an environmental condition. The sensor includes an input that detects an environmental condition. In one embodiment, the sensor output has first and second states, wherein the sensor output changes between states in response to detecting a change in an environmental condition. Other sensors may have a multi-state output. In some embodiments, the sensor is a unidirectional device that remains in the second state, or is latched, after transitioning states. In other embodiments, the sensor output may switch between states.

In one embodiment, the sensor is selected from a group of sensors comprising: a pressure sensor; a light sensor; a radiation sensor; a moisture sensor; a charge sensor; and a conductivity sensor. A pressure sensor output may change states when the detected pressure changes some specified amount, for example, relative to a specified pressure threshold or a change having a specified magnitude. A radiation sensor may change states upon exposure to radiation, for example, upon exposure to x-ray or microwave radiation or upon exposure to some other non-visible portion of electromagnetic spectrum. A light sensor may change states upon exposure to visible light. The foregoing list of sensors is not intended to limit the scope of the disclosure since any type of sensor may be combined with the near-field activated circuit. There could also be a combination of these and/or other sensors coupled to the near-field activated circuit.

In FIG. 2, in one use case, the sensor 230 changes states upon detecting an environmental condition other than the electromagnetic field that energizes the near-field activated circuit 210. In one embodiment, the sensor output is coupled to an input of the near-field activated circuit in a manner that controls the output produced by the near-field activated circuit. Thus in the presence of an energizing electromagnetic field, the near-field activated circuit 210 produces an output signal that includes information dependent on a state or output of the sensor 230. The information may be modulated or otherwise encoded on the output signal transmitted by the near-field activated circuit. In one particular application, the output signal only includes information after the sensor transitions between states. In another particular application, the information on the output signal of the near-field activated circuit is different when sensor is in the first state than when the sensor is in the second state. In embodiments having multiple sensors, the information on the output signal transmitted by the near-field activated circuit may be dependent on the number and/or type of sensors that have changed states. Some exemplary use cases are discussed further below.

Figure 3:
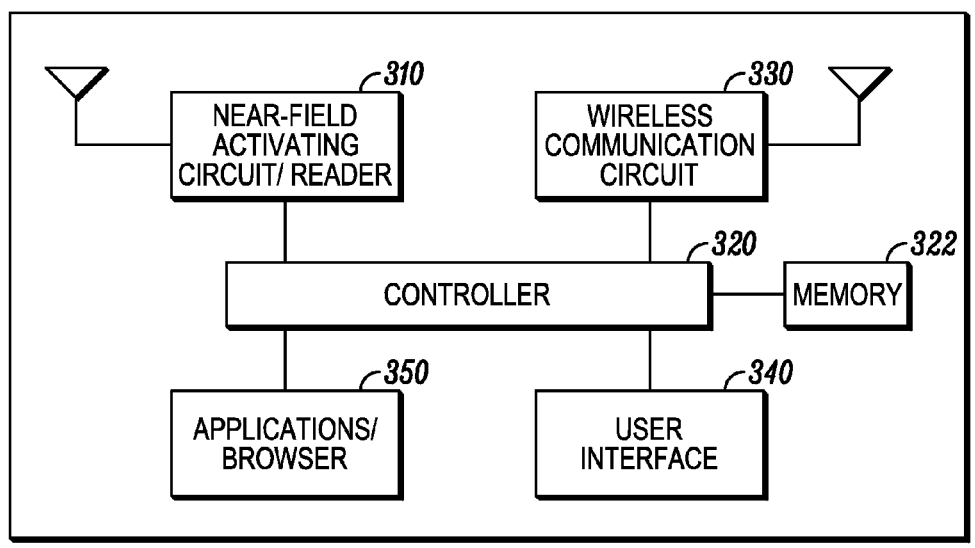
FIG. 3 is a schematic block diagram of an interrogating device including an activating circuit.

FIG. 3 illustrates an interrogating device 300 including a near-field activating circuit 310 that produces an electromagnetic field capable of energizing a near-field activated circuit, for example, the device 200 in FIG. 2. The electromagnetic field strength of the interrogating device is sufficiently strong to activate the near-field activated circuit when the devices are sufficiently proximate to each other. In FIG. 3, the near-field activating circuit 310 also has the ability to receive and decode information encoded on the signal transmitted by the near-field activated circuit. Thus the near-field activating circuit may read the activated circuit. A controller 320, having an associated memory 322, is coupled to the circuit 310. In some embodiments, the controller, which may include a DSP, or some other decoding circuitry decodes the information read from the near-field activated circuit.

In some embodiments, the interrogating device 300 of FIG. 3 is also capable of writing information to a near-field activated circuit. Such information may be written to a nonvolatile memory device, for example, to memory 220 in the device 200 in FIG. 2. In some embodiments, the interrogating device includes memory 322 for storing information read from the near-field activated circuit. This information may be processed using an application executed by the controller or by another application processor residing on the device. In FIG. 3, the device 300 includes a wireless transceiver 330 for communicating with a communications network, for example, a cellular network or a LAN or WAN. Information read from the near-field activated circuit may thus be communicated to an entity for storage or processing via the communications network. The device 300 of FIG. 3 also typically includes a user interface 340 and may include a browser or applications 350, which may be stand-alone applications or client-based applications. In one embodiment, the device 300 is a cellular telephone or some other portable or handheld consumer electronic device. In another embodiment, the device 300 is dedicated to activating and reading near-field activated devices.

Generally, the wireless communication device having a near-field activated circuit and a sensor, for example, the device 200 of FIG. 2, may have multiple states. In a first device state, information cannot be read from the device. In a second device state, information may be read from the device. In one embodiment, the first and second device states are dependent on a state of the sensor, wherein the device is in the first state when the sensor is in a first state and the device is in a second state when the sensor changes states. In some embodiments, information cannot be written to the device in the first or second states. In another embodiment, information may be written to the device only in a third state, wherein the third device state is independent of the state of the sensor.

Figure 4:
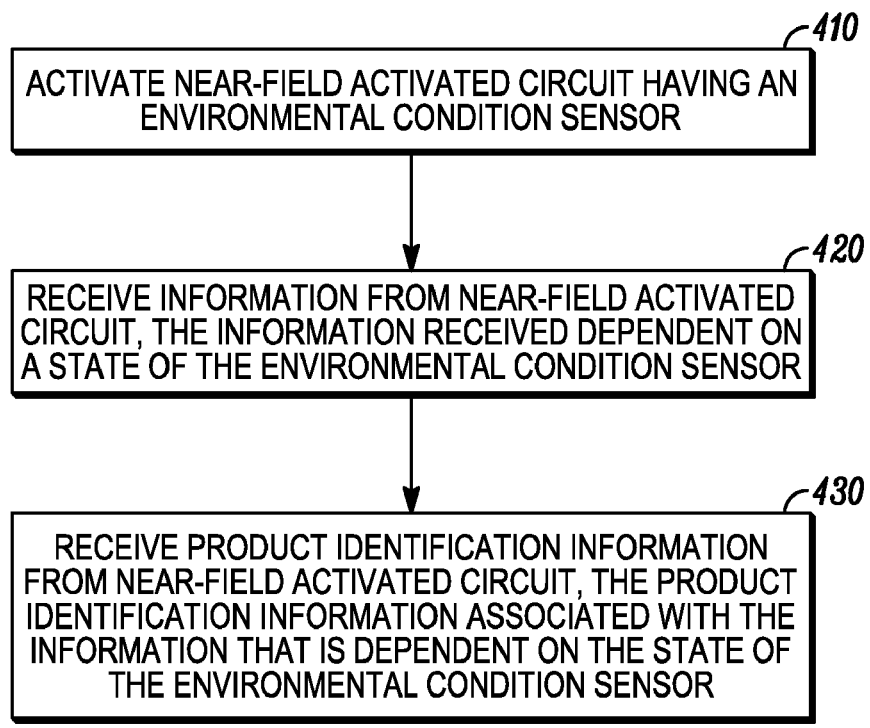
FIG. 4 is a process flow diagram.

In the process flow diagram of FIG. 4, at 410, a device having a near-field activated circuit and a sensor is activated by an electromagnetic field produced by an activating device. The sensor changes state upon detection of an environmental condition other than the energizing field. The state of the sensor may change before or after interrogation by the activating circuit. At 420, the activating device receives information from the near-field activated circuit, wherein the information received is dependent on the state of the sensor.

Generally, the information transmitted by the near-field activated circuit before the sensor changes states is different than the information that is transmitted after the sensor changes states. In one embodiment, the near-field activated circuit only transmits information after the sensor changes states. In other words, before the sensor changes states, the output signal of the near-field sensor contains no information. In another embodiment, the near-field activated circuit transmits information independent of the state of the sensor. After the sensor changes state, the near-field activated circuit transmits some new information that is not transmitted before the sensor changes states. For example, after the sensor changes states, the new information may be some information in addition to, and possibly associated with, the information that is transmitted independent of the state of the sensor. In embodiments where a product is involved, the near-field activated circuit may transmit product identification information, e.g., UPC information, independent of the state of the sensor.

In one embodiment, in FIG. 1, a wireless communication device 112 energized by an electromagnetic field is combined with a product 110. The device 112 may be embodied as a tag embedded in the product. In embodiments where the tag includes a sensor that changes states, the output signal of the near-field activated circuit may include information indicative of a product being exposed to an environmental condition detected by the sensor. Alternatively, the output signal of the near-field activated circuit may include information indicative of a state of the product. For example, before the sensor changes states, the tag may provide no information or provide only limited information. After the sensor changes state, the tag may provide some additional information, for example, information indicative of the state change or information indicative of a condition of the product or some other information. In some embodiments, some information, for example, product identification information, may be provided independent of the state of the sensor. In some embodiments, additional information may be incentive based information, such as a coupon or entry ticket for a sweepstakes. Alternatively, the product information alone or in combination with some other information may be provided only after the sensor changes states.

In some embodiments where the sensor remains latched in the second state after transitioning from the first state, the tag could be used to determine whether a warranty has been voided as a result of product misuse. Examples of product misuse include but are not limited to immersion in a liquid, exposure to radiation, de-pressurization, etc. In such applications, the tag may only provide information after the sensor changes states. More generally, the tag may include multiple sensors and provide different outputs for each sensor that changes states. In embodiments having multiple sensors, the information provided by the tag may be encoded to indicate that more than one sensor has changed states. The use of multiple sensors may enable a manufacturer to determine whether a product has been exposed to multiple environmental conditions. Thus manufacturers may be able to determine whether the warranty of returned products has been voided by interrogating the tag embedded in the product.

In applications where a product includes a tag that communicates inventory information, for example, product identification information, this information may be communicated to an inventory management application. In FIG. 1, for example, interrogating device 120 may communicate the information to an inventory management application running on a remote server 132 via the network 130. FIG. 3 illustrates a device 300 capable of activating a near-field activated circuit and communicating information read therefrom to a remote entity via a network.

In another embodiment, the output signal of the near-field activated circuit includes information selected from a group comprising: an address; a key; and a message. In one embodiment, the address is selected from a group comprising: universal resource locator address; a web address; a geographic location coordinate; a postal address; a telephone number; and an email address. In one use case, the near-field activated circuit transmits this information, upon activation, only after the sensor changes state. For example, the sensor could be of a type that detects when a product has been opened. After opening the product and upon interrogation, address information is transmitted for use in product registration, warranty activation, etc.

In promotional campaigns, after the sensor changes states, the tag may transmit a coupon for a discount or a prize or other incentive upon interrogation. In such applications, the interrogating device is a cell phone or other consumer electronic device having a near-field activating circuit. This information may be provided in the form of a message. The message may also include an authorizing key code and an address where the prize or incentive may be redeemed or where promotional information may be obtained. The message may also include UPC information. In one particular application, the sensor changes states upon opening or using the product. In this application, the sensor is latched after changing states.

After the sensor changes states, the near-field activated circuit transmits the coupon to the activating device, for example, the product purchaser's cell phone. The user may then be prompted to redeem the incentive by visiting the address, for example, a website.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication device energized by an electromagnetic field produced by another device, the wireless communication device comprising:
   a near-field activated circuit transmitting an output signal upon exposure to an energizing electromagnetic field; and
   a sensor having an output coupled to the near-field activated circuit, the sensor producing a signal on the output of the sensor in response to sensing an environmental condition other than the energizing electromagnetic field, the output signal of the near-field activated circuit including incentive-based information selected from the group consisting of: sweepstakes information and a coupon, wherein the sensor produces the signal in response to sensing the environmental condition.

2. The device of claim 1 wherein the sensor is selected from the group consisting of: a pressure sensor, a light sensor, a radiation sensor, a moisture sensor, a charge sensor, and a conductivity sensor.

* * * * *